Dec. 18, 1934.   E. R. WALKER ET AL   1,984,609
FOLDING BLANK BOX
Filed Jan. 31, 1933   4 Sheets-Sheet 1

Inventors
ELLIOTT R. WALKER
AND
CHARLES ROEHM
By Dorsey & Cole
Attorney

Dec. 18, 1934.  E. R. WALKER ET AL  1,984,609
FOLDING BLANK BOX
Filed Jan. 31, 1933  4 Sheets-Sheet 2
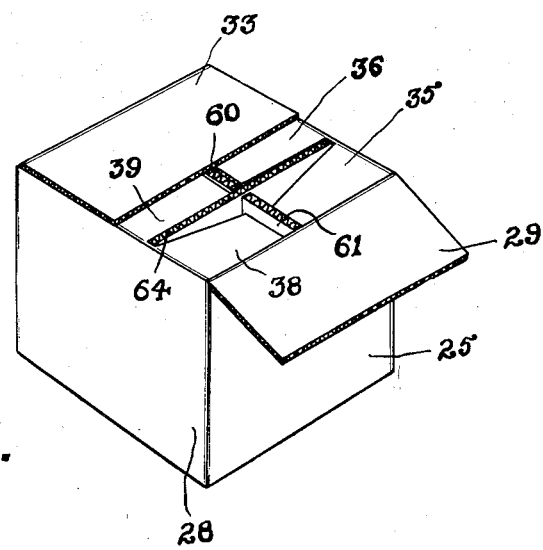
FIG. 7.
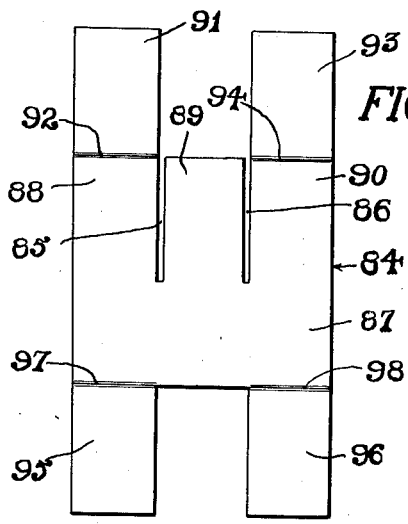
FIG. 8.
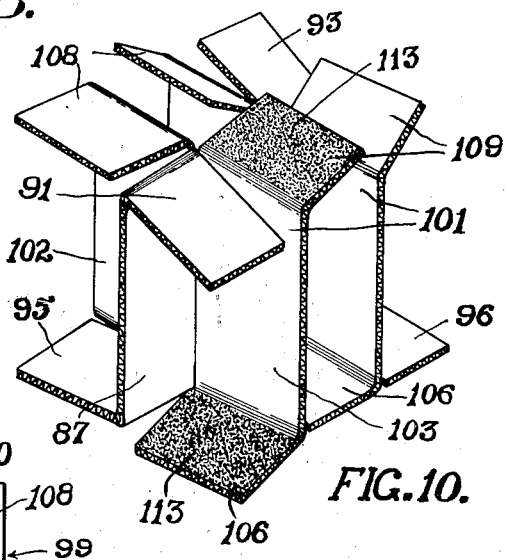
FIG. 10.
FIG. 9.
Inventors
ELLIOTT R. WALKER
AND
CHARLES ROEHM
Dorsey & Cole
Attorney Dec. 18, 1934.  E. R. WALKER ET AL  1,984,609
FOLDING BLANK BOX
Filed Jan. 31, 1933  4 Sheets-Sheet 3

Inventors
ELLIOTT R. WALKER
AND
CHARLES ROEHM
Dorsey & Cole
Attorney

Dec. 18, 1934.  E. R. WALKER ET AL  1,984,609
FOLDING BLANK BOX
Filed Jan. 31, 1933    4 Sheets-Sheet 4

Inventor
ELLIOTT R. WALKER
AND
CHARLES ROEHM

By Dorsey & Cole
Attorney

Patented Dec. 18, 1934

1,984,609

UNITED STATES PATENT OFFICE 1,984,609

FOLDING BLANK BOX

Elliott R. Walker, Brooklyn, and Charles Roehm, Corning, N. Y., assignors to Corning Fibre Box Corporation, Corning, N. Y., a corporation of New York Application January 31, 1933, Serial No. 654,484

9 Claims. (Cl. 229—15)

This invention relates to packing boxes for paint cans, bottles and the like, so constructed as to provide a separate cell for each such object and to furnish extra protection therefor against both internal and external shocks.

It is an object of the invention to produce a box as described which shall have great strength and rigidity due to reinforcements strategically arranged according to the various strains to which it may be subjected.

It is a further object to furnish a box of the character described which may be constructed of blanks so cut as to provide a minimum of waste material, and so designed as to be capable of assembly with the least possible effort.

It is another object to provide a box having several cells completely devisible one from the other by protective flaps which form a part of the main blank, and to so fold these flaps that each cell is separately protected at top and bottom, and each partition member is securely locked against motion in any direction, by being foldably incorporated with the main blank.

It is yet another object to furnish a box which may be assembled in such a manner that each cell is separately closed and may be separately opened, leaving the other cells sealed.

Boxes comprising cells and an outer wrapper, as known in the art, are incapable of giving the protection to their contents which is attained by the invention to be herein described, due to a lack of co-ordination and co-operation between the box proper and the partitioning members such as to prevent relative movement and displacement between the two. There is in the art no method or device for providing a separate and additional protection for each cell, this protection being provided by elements which are an integral part of the box assembly.

Having these points and objects in mind, and others to appear as the description proceeds, reference is had to the accompanying drawings, in which Figures 1 to 7 inclusive show the first modification of the invention.

Figure 7 is a perspective of the entire assembly, ready for final folding and sealing one of the outer flaps being folded down to hide half of the partition members and cells;

Figures 8 to 11 inclusive represent a second modification in which:—

Figure 11:
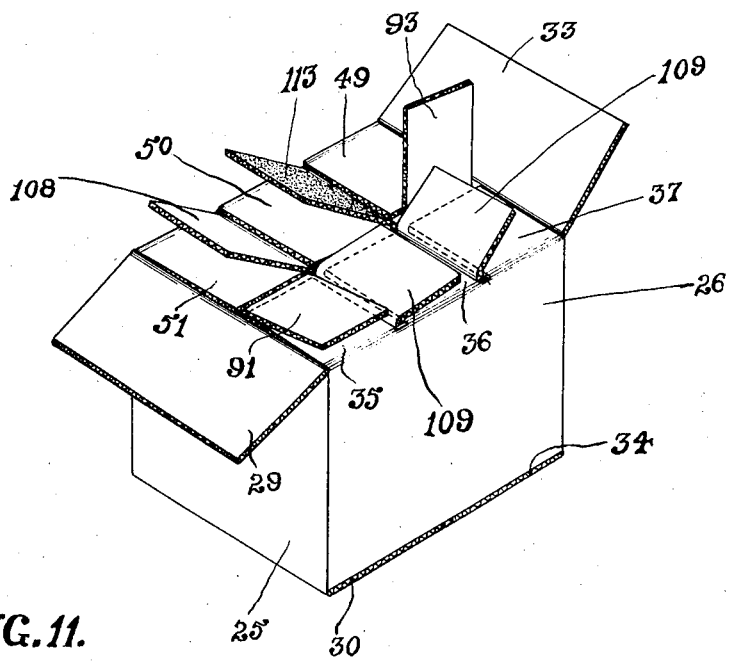

Figures 8 and 9 are plan views of the modified partitioning members;

Figure 10 is a perspective of these partitioning members assembled and partly folded; and Figure 11 is a perspective of the entire assembly of the second modification, ready for sealing.

Figures 12, 13:
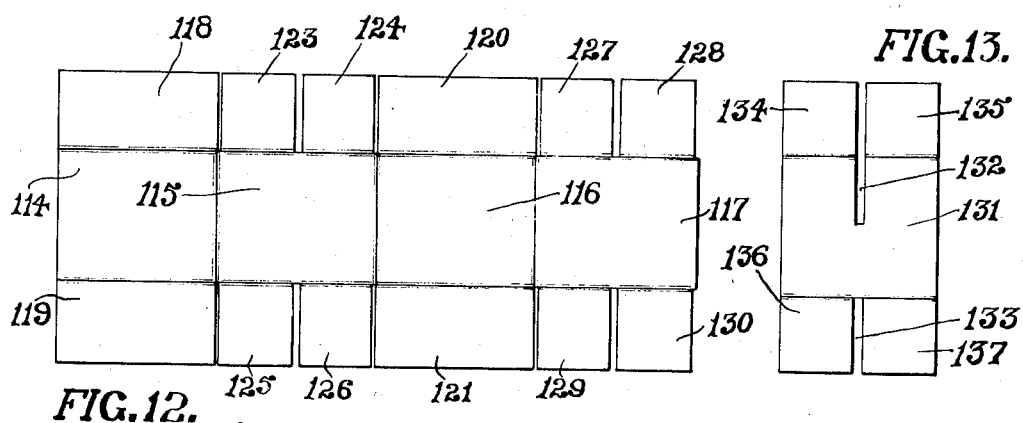
Figure 14:
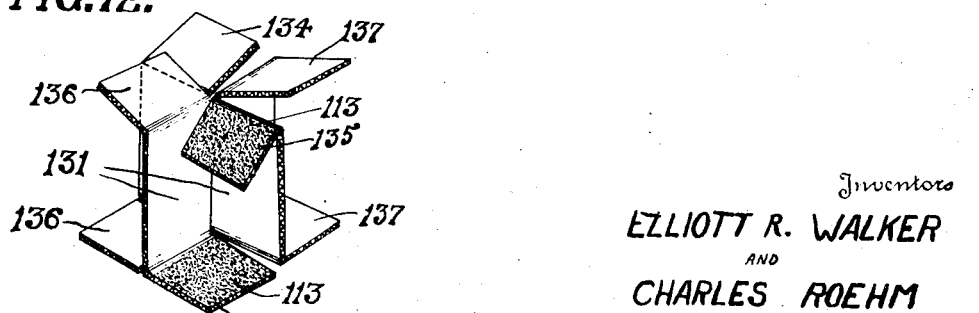
Figure 15:
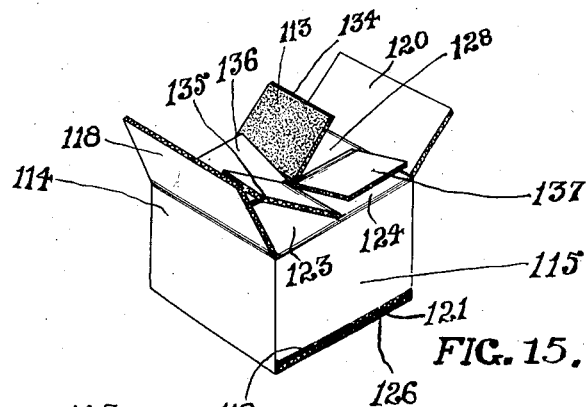

Figures 12 to 15 inclusive represent a third modification, differing from the first chiefly in the number of compartments;

Figure 12 is a plan view of the main blank of the box;

Figure 13 is a plan view of one of the partitioning blanks, both of which are the same;

Figure 14 is a perspective of the two partitioning blanks when assembled and partly folded;

Figure 15 is a perspective of the entire assembly of the third modification, ready for sealing.

Figure 16:
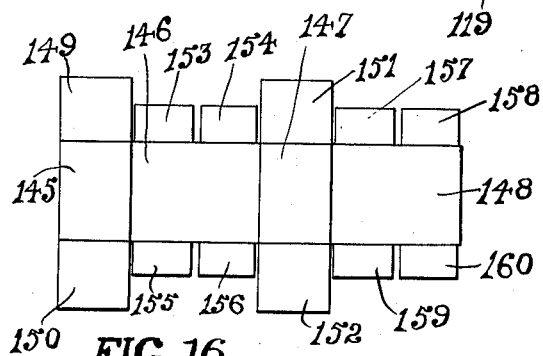
Figure 17:
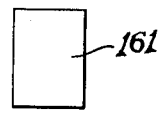
Figures 18, 19:
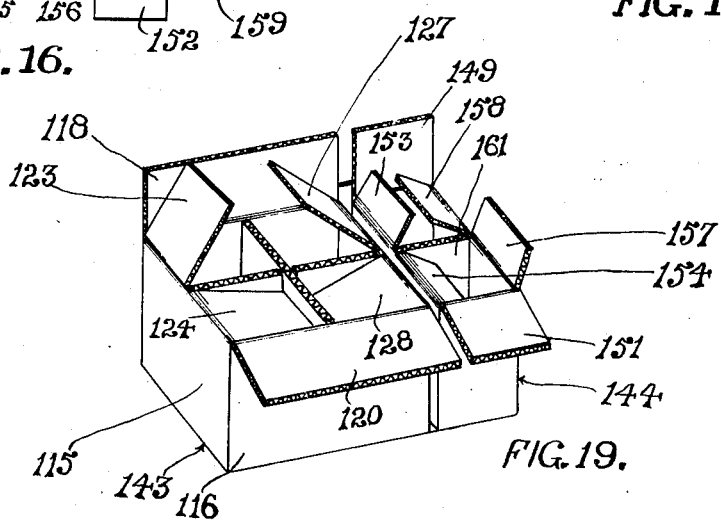

Figures 16, 17 and 19 represent a fourth modification, having two compartments.

Figure 16 is a plan view of the main blank;

Figure 17 is a plan view of the partitioning member used with the blank of Figure 16; and Figure 19 is a perspective of the box when assembled and ready for sealing.

Figure 18 is a perspective view of still another modification, similar to the box of Figure 7, except in the number of compartments. Figures 18 and 19 are shown closely adjoining for a purpose to be discussed later.

Figure 1:
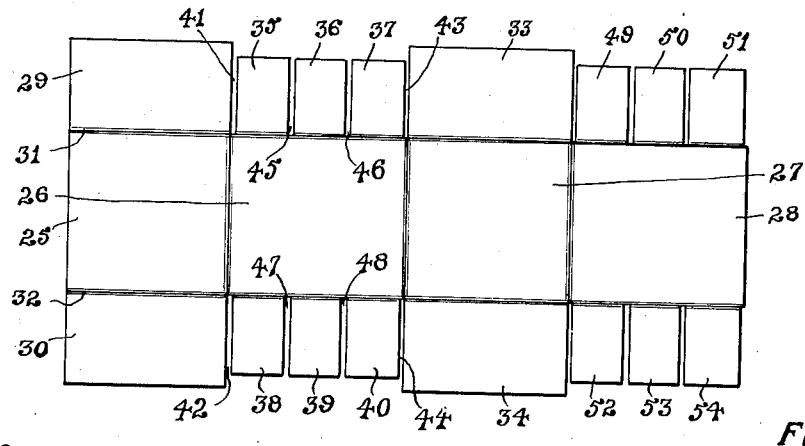
Figure 1 is a plan view of the main blank or body of the box.

In Figure 1 is shown the main blank of the first modification. Surfaces 25, 26, 27 and 28 will, when folded, form the side walls of the box and are divided from one another by lines for folding, which it is thought it is not necessary to designate by numerals. Integral with side 25 are flaps 29 and 30 set off by lines for folding, 31 and 32; and integral with side 27 are similar flaps 33 and 34. From side 26 extend three flaps at both top and bottom, these flaps being numbered 35, 36 and 37 at the top, and 38, 39 and 40 at the bottom. It will be noted that flaps 35—40 fold on lines which are continuations of lines 31 and 32, and further that flaps 35 and 38 are divided from flaps 29 and 30 by slots 41 and 42 extending to the folding line. Flaps 37 and 40 are similarly divided from flaps 33 and 34 by slots 43 and 44. Flaps 36 and 39 are separated by slots 45, 46, 47 and 48, as is clearly shown. Side 28 has similar extensions in flaps 49, 50, 51, 52, 53 and 54, divided by slots identical with those dividing flaps 35—40, and a further discussion or enumeration of these slots is considered unnecessary.

Figure 2:
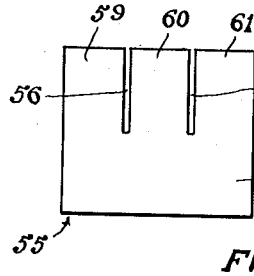
Figures 2 and 3 are plan views of the partition blanks.
Figure 3:
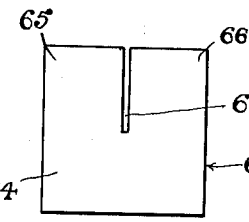
Figure 4:
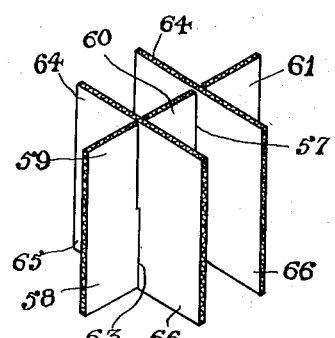
Figure 4 is a perspective of the blanks of Figures 2 and 3 when assembled ready for insertion in the box.

Figures 2 to 4 show the partitioning members designed for use in this modification. The blank of Figure 2, designated generally at 55, is divided by two slots 56 and 57 into four areas; a main surface 58 and three flaps 59, 60 and 61. Slots 56 and 57 extend slightly beyond the midline of blank 55, so that flaps 59—61 are slightly longer than the vertical measurement of surface 58. Figure 3 shows another blank 62 divided by a single slot 63 into a main surface 64 and two flaps 65 and 66. Slot 63 extends slightly beyond the midline of blank 62. It is pointed out that in the assembly, as shown in Figure 4, two blanks 62 are used, but since these are identical it is not considered necessary to show them both. In Figure 4 and others showing the partition members assembled, similar reference numerals will be used for both these blanks. Thus, as shown in Figure 4, the two blanks 62 are inserted so that the two slots 63 enter into and engage slots 56 and 57 to form a figure partially defining six cells.

Figure 5:
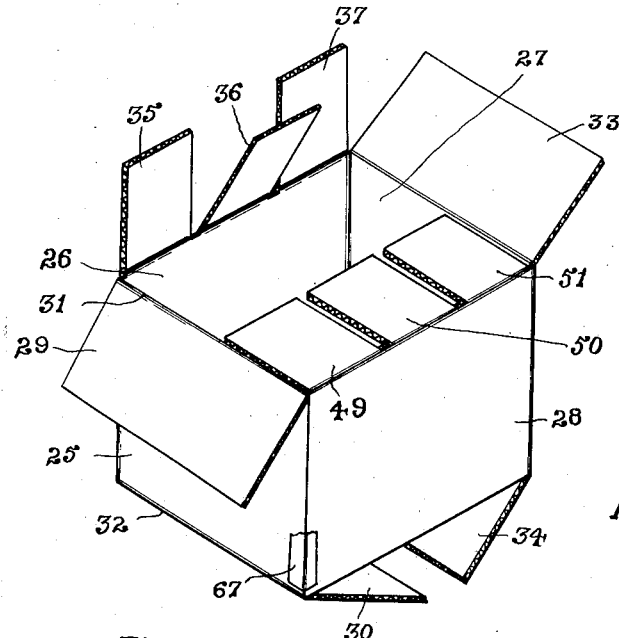
Figure 5 is a perspective of the blank of Figure 1, partly folded.
Figure 6:
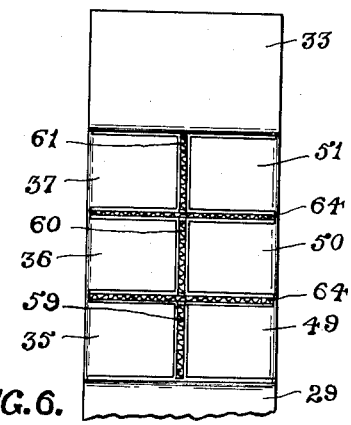
Figure 6 is a top plan view of the box with the partition members in place.

The elements of the box having been described separately and in detail, the assembly may now be discussed. As a first step, the blank of Figure 1 is folded until the outer edges of sides 25 and 28 are brought together, when they are secured as by adhesive tape 67, or any other suitable means. The blank then assumes the partially folded form shown in Figure 5, flaps 49, 50 and 51 being bent to their final position but flaps 35, 36 and 37 being displaced for purposes of clearer illustration. The composite partitioning member of Figure 4 is then inserted so that both at top and bottom its edges fit into the slots between flaps 35—40 and 49—54, and so divide and hold rigidly in place each of these flaps, as best shown in Figures 6 and 7. The result is an exceedingly compact and rigid structure, strong enough to resist shocks from any angle. It will be noted that the partitioning members of Fig. 4 are held against movement in any direction by the flaps 35—40 and 49—54, which in turn are held from movement by the edges of the partitioning members; and since these flaps are integral with the walls of the box, the walls are firmly held against collapse or deformation of any kind. It will be noticed that throughout the structure the blanks of which the box is composed are of such a shape as to minimize wastage in their stamping.

Referring now to the second modification as shown in Figs. 8 to 11, the additional feature is the change in the partitioning members, which add another thickness at top and bottom of the compartments and make possible the individual sealing of the compartments. As in Figs. 2 and 3, the partitioning members are shown in Figs. 8 and 9; two blanks such as illustrated in Figure 9 being utilized in co-operation with one as shown in Figure 8. The latter, designated as a whole by the numeral 84, comprises a central portion which is divided by slots 85 and 86 into a surface 87 and three flaps or extensions thereof 88, 89 and 90. Extending from flap 88 and integral therewith is a flap 91 set off by a folding line 92. Similarly extending from flap 90 is a flap 93 set off by a folding line 94. Extending in the opposite direction from 87 are two flaps 95 and 96, set off therefrom by folding lines 97 and 98 respectively. Slots 85 and 86 extend slightly beyond the midline of the central portion. In Figure 9 is shown at 99 one of the co-operative members, having a central portion divided by a slot 100 extending slightly beyond the midline of such central portion and forming of it an area 101 and two flaps 102 and 103. Extending beyond flap 102 and integral therewith is a flap 104, set off by a folding line 105. Similarly extending beyond flap 103 is a flap 106 set off by a folding line 107. At the opposite side of the central portion extend two flaps 108 and 109, set off by folding lines 110 and 111, respectively, and divided by slot 112.

In the assembling of these elements, as has been shown in Figure 10, the slots 100 of the two blanks 99 are inserted within and co-operate with slots 85 and 86 of blank 84, whereupon the various flaps 91, 93, 95, 96, 104, 106, 108 and 109 are bent to substantially a 90° angle with their respective central portions. It will be seen in Figure 10 that if these flaps were at such a horizontal position the result would be a figure having six compartments completely surrounded except at the four sides.

In Figure 11 is shown the second modification assembled but not folded and sealed. The main box portion is the same as in the first modification and has been given similar reference numerals for similar parts. The difference, it will be seen in this figure, is that the partitioning members, instead of extending merely to the outer edges of flaps 35—40 and 49—54 when folded, are provided with extending flaps 91, 93, 95, 96, 104, 106, 108 and 109, which fold over upon and cover the first mentioned set of flaps. At 113 in various figures, the flaps of the partitioning members are shown stippled, but for purposes of clearness only one is so shown. This stippling represents a coating of glue or similar adhesive which is or may be applied to both upper and lower surfaces of these flaps. When this is done it will be observed that such flaps will adhere to flaps 55—40 and 49—54, and also to flaps 29, 30, 33 and 34, thus giving three thicknesses at top and bottom adhering as a unitary layer. The importance of this feature in the retail trade will be apparent, since such a gluing complies in every respect with express and freight regulations, thus making it unnecessary to tape or glue the outer wrappings unless such is desirable. Also, this process locks each cell separately, so that the box may be considered divided into two, four or six sealed compartments.

The third modification of the invention, shown in Figs. 12 to 15 inclusive, shows the essential elements of the first and second modifications, except that fewer compartments are provided. The main blank, Figure 12, consists of the four sides 114, 115, 116 and 117; flaps 118 and 119 extending from opposite edges of side 114 and flaps 120 and 121 extending similarly from sides 116. From sides 115 and 117 extend flaps 123, 124, 125 and 126; 127, 128, 129, and 130, as shown. It is not considered necessary to describe these in detail, since their functions and methods of folding and co-operation are similar to those shown in Figure 5. In Figure 13 is shown one of the partitioning blanks, having a central portion 131 divided by slots 132 and 133 into flaps 134, 135, 136 and 137. Two of these blanks are used and are joined so that the two slots 132 fit together to form the partially folded partitioning member shown in Figure 14. In Figure 15, a view similar to Figure 11, the elements of the third form of box are shown assembled but not sealed or completely folded. Flaps 134—137 extend beyond flaps 123—130 and fold over upon and may be glued to these flaps, while flaps 118—121 in turn cover flaps 134—137. In this form internally there is the same co-ordination between the flaps of the main box and those of the partitioning elements to give great strength and rigidity.

Figures 16, 17 and 19 show the fourth modification of the invention, in which the box is provided with but two cells. This box is indicated generally at 144, the main blank being shown in Figure 16, having four sides 145, 146, 147 and 148. Extending from side 145 are the flaps 149 and 150, and extending from side 147 are flaps 151 and 152. Extending in a similar direction from side 146 are the flaps 153, 154, 155 and 156, and from side 148 extend the flaps 157, 158, 159 and 160. In folding, the outer edges of sides 145 and 148 are brought together and secured as by tape (not shown), when it assumes the shape shown in Figure 19. Figure 17 shows the partitioning member 161, which is a plain sheet of cardboard or the like, and fits into the slots between flaps 153—160.

Figure 18 shows a four-celled box indicated generally at 143, similar in all respects to the box of Figures 12–15, and the same reference numerals have been used in similar parts as in those figures. The difference is in the partition members, which are as shown in Figure 3, two of them being joined to form in the box four cells. The two boxes of Figures 18 and 19 are shown closely adjoining since it is sometimes desirable to secure these boxes within a common wrapper (not shown), and so make of them a six-celled container for shipping purposes.

It is thought that in the above description the merits common to all forms and distinct from the art have been sufficiently brought out. Whether or not the extra reinforcing flaps of the partitioning members are used, there is the individual protection to each cell provided by the flaps attached to the sides of the box, which fit into and force to their shape the deformable partitions; which in turn when so held prevent lateral movement of the flaps and so of the walls of the box.

It is recognized that there are other modifications within the scope of the invention which might attain the same results, and it is not intended that the appended claims shall be construed so narrowly as to include only the forms which have been shown for purposes of illustration.

Having thus described our invention what we claim as new and desire to secure by U. S. Letters Patent is:—

1. A blank box comprising a body having side walls, intersecting partitions arranged therein defining in connection with the side walls a plurality of cells, the ends of the partitions terminating substantially at the upper edges of the side walls, and a series of flaps integral with opposing side walls of the box spaced apart a distance substantially equal to the thickness of the partitions and adapted to extend into said cells between the partitions and to engage said partitions between them.

2. A blank box comprising a body having side walls, interlocking partitions arranged therein defining in connection with the side walls a plurality of cells, the ends of the partitions terminating substantially at the upper and lower edges of the side walls, and a series of flaps integral with opposing side walls of the box at both their upper and lower edges, such flaps being spaced apart a distance substantially equal to the thickness of the partitions and adapted to extend into said cells between the partitions at their upper and lower ends and to engage said partitions between them.

3. A blank box comprising a body having side walls, interlocking partitions arranged therein defining in connection with the side walls a plurality of cells, the ends of the partitions terminating substantially at the upper and lower edges of the side walls, a series of flaps integral with two opposing side walls of the box at both their upper and lower edges, such flaps being spaced apart a distance substantially equal to the thickness of the partitions and adapted to extend into said cells between the partitions at their upper and lower ends and to engage said partitions between them, and flaps integral with the other two opposing side walls at their upper and lower edges and adapted to fold upon and cover the first mentioned flaps.

4. A blank box comprising a body having side walls, interlocking partitions arranged therein defining in connection with the side walls a plurality of cells, the ends of the partitions terminating substantially at the upper edges of the side walls, a series of flaps integral with opposing side walls of the box spaced apart a distance substantially equal to the thickness of the partitions and adapted to extend into said cells between the partitions and to engage said partitions between them, and a second series of flaps integral with the said partitions and adapted to fold upon and cover the flaps integral with the side walls.

5. A blank box comprising a body having side walls, interlocking partitions arranged therein defining in connection with the side walls a plurality of cells, the ends of the partitions terminating substantially at the upper and lower edges of the side walls, a series of flaps integral with opposing side walls of the box at both their upper and lower edges, such flaps being spaced apart a distance substantially equal to the thickness of the partitions and adapted to extend into said cells between the partitions at their upper and lower ends and to engage said partitions between them, and a second series of flaps integral with the said partitions at their upper and lower ends and adapted to fold upon and cover the flaps integral with the side walls.

6. A blank box comprising a body having side walls, interlocking partitions arranged therein defining in connection with the side walls a plurality of cells, the ends of the partitions terminating substantially at the upper and lower edges of the side walls, a series of flaps integral with two opposing side walls of the box at both their upper and lower edges, such flaps being spaced apart a distance substantially equal to the thickness of the partitions and adapted to extend into said cells between the partitions at their upper and lower ends and to engage said partitions between them, a second series of flaps integral with the said partitions at their upper and lower ends and adapted to fold upon and cover the said flaps integral with the side walls, and a third set of flaps integral with the other opposing side walls of the box at their upper and lower edges and adapted to fold upon and cover the said second series of flaps.

7. A blank box comprising a body having side walls, interlocking partitions arranged therein defining in connection with the side walls a plurality of cells, the ends of the partitions terminating substantially at the upper edges of the side walls, a series of flaps integral with two opposing side walls of the box spaced apart a distance substantially equal to the thickness of the partitions and adapted to extend into said cells between the partitions and to engage said partitions between them, a second series of flaps integral with the said partitions and adapted to fold upon and cover the flaps integral with the side walls, a third set of flaps integral with the other two opposing side walls of the box at their upper edges and adapted to fold upon and cover the second series of flaps, and a layer of adhesive material applied to the upper and lower surfaces of the second series of flaps whereby the said three sets of flaps are caused to adhere in a unitary thickness.

8. A blank box comprising a body having side walls, interlocking partitions arranged therein defining in connection with the side walls a plurality of cells, the ends of the partitions terminating substantially at the upper and lower edges of the side walls, a series of flaps integral with two opposing side walls of the box at their upper and lower edges spaced apart a distance substantially equal to the thickness of the partitions and adapted to extend into said cells between the partitions and to engage said partitions between them, a second series of flaps integral with the said partitions at their upper and lower edges and adapted to fold upon and cover the first series of flaps, a third set of flaps integral with the other opposing side walls of the box at their upper and lower edges and adapted to fold upon and cover the second series of flaps, and a layer of adhesive material applied to the upper and lower surfaces of the second series of flaps whereby the said three sets of flaps are caused to adhere in a unitary thickness at the top and bottom of the box.

9. A blank box comprising a body having side walls, a partition therein defining in connection with the side walls a plurality of cells, the ends of the partition terminating substantially at the upper and lower edges of the side walls, and flaps integral with opposing side walls of the box at both the upper and lower edges, such flaps being spaced apart a distance substantially equal to the thickness of the partition and adapted to extend into said cells and to engage the said partition between them.

ELLIOTT R. WALKER.
CHARLES ROEHM.